US009898750B2

(12) United States Patent
Compton et al.

(10) Patent No.: US 9,898,750 B2
(45) Date of Patent: Feb. 20, 2018

(54) PLATFORM FOR DISTRIBUTION OF CONTENT TO USER APPLICATION PROGRAMS AND ANALYSIS OF CORRESPONDING USER RESPONSE DATA

(71) Applicant: SenseiX, Inc., Malden, MA (US)

(72) Inventors: Duane Charles Compton, Lexington, MA (US); Wai Cheng, Melrose, MA (US); Christopher Hiller, Lexington, MA (US); Henry Jonas Solberg, La Grange Park, IL (US)

(73) Assignee: SenseiX, Inc., Malden, MA (US)

( * ) Notice: Subject to any disclaimer, the term of this patent is extended or adjusted under 35 U.S.C. 154(b) by 430 days.

(21) Appl. No.: 14/699,535

(22) Filed: Apr. 29, 2015

(65) Prior Publication Data

US 2016/0321050 A1 Nov. 3, 2016

(51) Int. Cl.
*G06Q 30/00* (2012.01)
*G06Q 30/02* (2012.01)

(52) U.S. Cl.
CPC ..... *G06Q 30/0214* (2013.01); *G06Q 30/0209* (2013.01)

(58) Field of Classification Search
USPC ........................................................ 705/14.1
See application file for complete search history.

(56) References Cited

U.S. PATENT DOCUMENTS

| 2006/0229896 | A1* | 10/2006 | Rosen | G06Q 10/10 705/321 |
| 2007/0281285 | A1* | 12/2007 | Jayaweera | G09B 7/02 434/156 |
| 2008/0256015 | A1* | 10/2008 | Woolf | A63F 13/12 706/48 |
| 2009/0047648 | A1* | 2/2009 | Ferreira | G09B 7/08 434/323 |
| 2009/0280466 | A1* | 11/2009 | Hines | G09B 7/02 434/362 |
| 2011/0129808 | A1* | 6/2011 | Srivastava | G09B 7/02 434/322 |
| 2011/0229864 | A1* | 9/2011 | Short | G09B 7/00 434/219 |
| 2013/0122980 | A1* | 5/2013 | Lachina | A63F 9/24 463/9 |

(Continued)

*Primary Examiner* — Luis A Brown
(74) *Attorney, Agent, or Firm* — Ryan, Mason & Lewis, LLP

(57) ABSTRACT

A processing platform is configured for distribution of content to user application programs over a network and analysis of corresponding user response data received over the network. The user application programs are provided by respective ones of a plurality of application developers. The processing platform comprises at least one content repository configured to store the content, at least one content distribution and analysis application programming interface exposed to the network, one or more user web portals associated with said at least one content distribution and analysis application programming interface, one or more developer web portals associated with said at least one content distribution and analysis application programming interface, a plurality of user services accessible via the one or more user web portals, and a plurality of developer services accessible via the one or more developer web portals.

20 Claims, 10 Drawing Sheets

(56) References Cited

U.S. PATENT DOCUMENTS

| | | | | |
|---|---|---|---|---|
| 2013/0318160 | A1* | 11/2013 | Beraka | H04L 67/104 709/204 |
| 2014/0087355 | A1* | 3/2014 | Henry | G09B 7/00 434/362 |
| 2014/0272908 | A1* | 9/2014 | Black | G09B 5/08 434/362 |
| 2015/0024817 | A1* | 1/2015 | Hawkins | A63F 13/35 463/9 |
| 2015/0058336 | A1* | 2/2015 | Davis | G06F 17/30867 707/732 |
| 2015/0161903 | A1* | 6/2015 | Colliander | G09B 7/06 434/350 |
| 2016/0063440 | A1* | 3/2016 | Webb | G06Q 10/10 705/7.24 |
| 2016/0117941 | A1* | 4/2016 | Mitchell | G09B 5/12 434/362 |
| 2016/0301675 | A1* | 10/2016 | Wiles | H04L 63/083 |

* cited by examiner

PLATFORM FOR DISTRIBUTION OF CONTENT TO USER APPLICATION PROGRAMS AND ANALYSIS OF CORRESPONDING USER RESPONSE DATA

FIELD

The field relates generally to information processing systems, and more particularly to content distribution within such systems.

BACKGROUND

A wide variety of different information processing systems for content distribution are known, including systems that distribute content to mobile applications and other types of user application programs. However, such systems are deficient in important respects. For example, user application programs, particularly in the context of applications developed for use on mobile telephones or other portable devices, are often generated by a diverse array of unrelated application developers. As a result, content providers often have to adapt their content repeatedly to the particular requirements of the numerous different development environments that are utilized by the developers, increasing the cost and complexity associated with content distribution. Similarly, it can be difficult for the developers to obtain the particular types of content that are best suited to their respective application programs. This can lead to a significant duplication of development effort by multiple distinct developers, increasing the cost and complexity of the application program development process.

SUMMARY

We have found that conventional systems are generally not able to distribute content efficiently to numerous different types of otherwise unrelated user application programs while also providing centralized analysis relating to the manner in which users interact with such content through those application programs.

Illustrative embodiments of the invention provide processing platforms configured to implement content distribution and analysis services. For example, in some embodiments, a given such platform is configured to provide content distribution and analysis services to user application programs, such as applications running on mobile telephones or other types of user devices. These and other embodiments are illustratively configured to provide significant advantages in terms of content distribution and analysis relating to educational content and in numerous alternative content distribution and analysis contexts.

In one embodiment, a processing platform is configured for distribution of content to user application programs over a network and analysis of corresponding user response data received over the network. The user application programs are provided by respective ones of a plurality of application developers. The processing platform comprises at least one content repository configured to store the content, at least one content distribution and analysis application programming interface exposed to the network, one or more user web portals associated with said at least one content distribution and analysis application programming interface, one or more developer web portals associated with said at least one content distribution and analysis application programming interface, a plurality of user services accessible via the one or more user web portals, and a plurality of developer services accessible via the one or more developer web portals. The user services illustratively include user reporting services configured to process the user response data. The developer services illustratively include application management services configured to ensure interoperability of the content with the user application programs provided by the plurality of application developers.

These and other embodiments include but are not limited to methods, apparatus, systems, processing devices, integrated circuits, and computer-readable storage media having computer program code embodied therein.

DETAILED DESCRIPTION

Embodiments of the invention will be illustrated herein in conjunction with exemplary information processing systems that include particular arrangements of networks, processing devices and other components utilized in provision of content distribution and analysis services. It should be understood, however, that embodiments of the invention are more generally applicable to a wide variety of other types of information processing systems and associated networks, processing devices or content distribution and analysis techniques. Accordingly, terms such as "information processing system," "network," and "processing device" as used herein are intended to be broadly construed.

Figure 1:
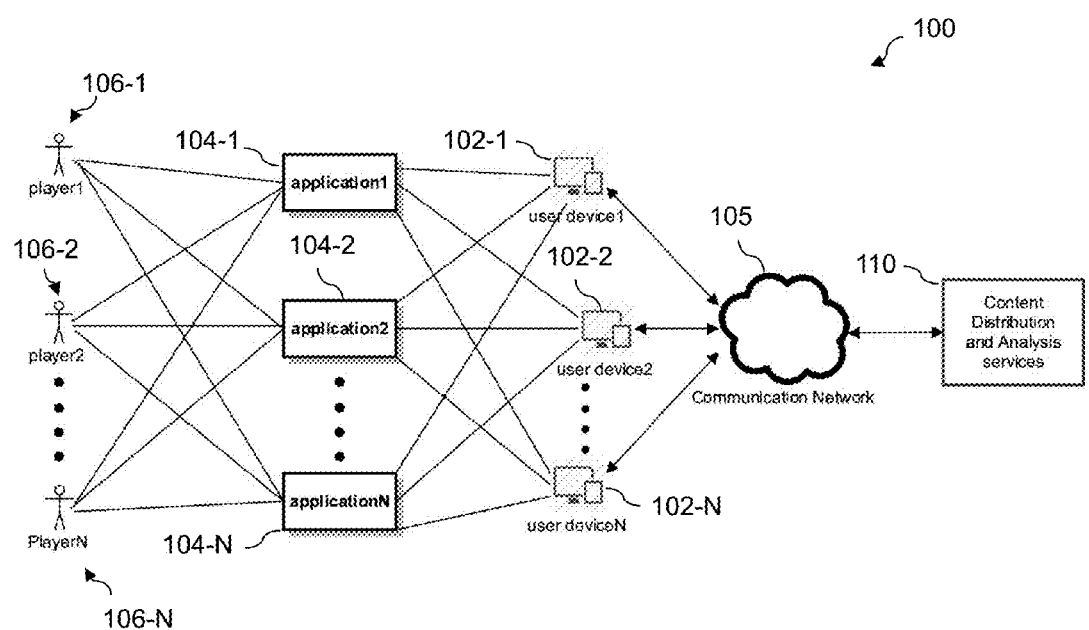
FIG. 1 shows an information processing system configured to provide content distribution and analysis services in an illustrative embodiment.

FIG. 1 shows an information processing system 100 configured to provide content distribution and analysis services in one embodiment. The system 100 illustratively comprises a plurality of user devices 102-1, 102-2, . . . 102-N having associated user application programs 104-1, 104-2, . . . 104-N. The user devices 102 are coupled to a communication network 105. The application programs 104 are utilized by system users 106-1, 106-2, . . . 106-N.

The user devices 102 illustratively comprise respective desktop computers, but can more generally comprise mobile telephones, tablet computers, laptop computers, gaming consoles or other types of processing devices in any combination.

The application programs 104 are shown as separate from the user devices 102, but are assumed to run on those user devices. The application programs 104 are examples of what are also referred to herein as "user application programs" or simply "applications." The applications are illustratively provided by respective ones of a plurality of different application developers, although it is possible in some embodiments that multiple ones of the applications can be provided by the same application developer. At least a subset of the applications 104 may comprise respective mobile applications particularly configured to run on mobile telephones or other types of portable devices.

It is more particularly assumed in this embodiment that each of the user devices 102 runs each of the applications 104 and that each of the applications 104 is utilized by each of the users 106 on at least one of the user devices 102. It is to be appreciated, however, that numerous other arrangements of user devices, application programs and system users are possible in other embodiments. For example, other embodiments can include different numbers of user devices, application programs and users. The arbitrary number N is used to identify the total number of each of these different types of system elements in the FIG. 1 embodiment solely for simplicity and clarity of illustration.

The applications 104 running on user devices 102 access a content distribution and analysis services platform 110 over the network 105. The network 105 may comprise a wide area network such as the Internet, although numerous alternative networks as well as combinations of multiple distinct types of networks can be used.

The content distribution and analysis services platform 110 is configured for distribution of content to applications 104 over the network 105 and analysis of corresponding user response data received over the network 105.

The users 106 are more particularly referred to in the context of the FIG. 1 embodiment as "players" as at least a portion of the content provided by the content distribution and analysis services platform 110 in this embodiment is assumed to comprise educational content, and more particularly educational content relating to educational games that are played by users. Numerous other types of content can be supported in other embodiments. The term "content" as used herein is intended to be broadly construed so as to encompass, for example, text, audio, video, images and other types of content items, as well as combinations thereof.

Additional details relating to illustrative implementations of the FIG. 1 system in a context relating to distribution and analysis of educational content will now be described with reference to FIGS. 2 and 3.

Figure 2:
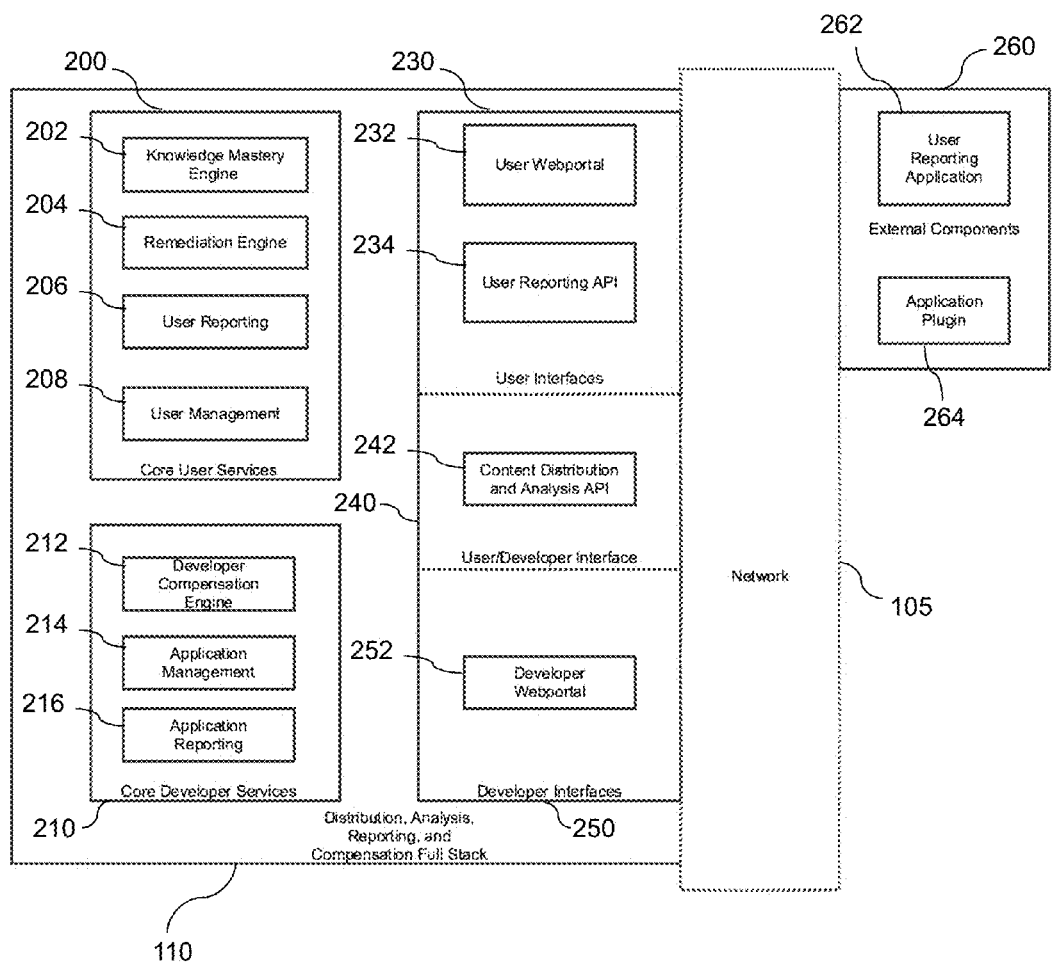
FIGS. 2 and 3 show more detailed views of portions of the FIG. 1 system as implemented in a context relating to distribution and analysis of educational content.

Referring now to FIG. 2, the content distribution and analysis services platform 110 in this implementation more particularly comprises a full services stack that provides distribution, analysis, reporting and compensation functionality. This example services stack is assumed to run on one or more processing devices of at least one processing platform of the information processing system 100. An illustrative embodiment of such a processing platform will be described in more detail below in conjunction with FIG. 10, although it is to be understood that numerous additional or alternative platforms may be used in providing content distribution and analysis services of the type disclosed herein.

Other embodiments can include different service stack configurations. For example, in another embodiment, the service stack can be configured to provide only distribution and analysis functionality.

The content distribution and analysis services platform 110 as illustrated in FIG. 2 comprises core user services 200 including a knowledge mastery engine 202, a remediation engine 204, a user reporting engine 206 and a user management module 208, and core developer services 210 including a developer compensation engine 212, an application management module 214 and an application reporting module 216.

Also included in the content distribution and analysis services platform 110 are user interfaces 230 comprising user web portal 232 and user reporting application programming interface (API) 234, a user/developer interface 240 comprising a content distribution and analysis API 242, and developer interfaces 250 comprising a developer web portal 252.

The content distribution and analysis services platform 110 communicates over network 105 with external components 260 that illustratively include a user reporting application 262 and an associated application plug-in 264. These external components 260 are assumed to be deployed on a given one of the user devices 102 coupled to the network 105. Other sets of external components 260 can be similarly deployed on respective other ones of the user devices 102 coupled to the network 105.

The user reporting API 234 is illustratively configured to interact with the user reporting application 262 running on the given one of the user devices 102 on which at least one of the user application programs 104 is also running.

The content distribution and analysis services platform 110 is assumed to comprise or otherwise have accessible thereto at least one content repository configured to store the content. Such repositories illustratively include one or more databases.

The content distribution and analysis API 242 is exposed to the network 105 and accessible by user devices 102, as well as other devices coupled to the network 105, such as devices operated by the application developers.

The user web portal 232 and the developer web portal 252 are examples of respective user and developer web portals associated with the content distribution and analysis API 242. In other embodiments, multiple instances of each of the user web portal 232 and the developer web portal 252 may be associated with the content distribution and analysis API 242.

It is assumed that the user web portal 232 and the developer web portal 252 both interface with the content distribution and analysis API 242. For example, the user and developer web portals 232 and 252 may be viewed in some embodiments as respective presentation layers supported by the API 242.

Distribution of content in the FIG. 1 embodiment generally flows through the content distribution and analysis API 242 to the user applications 104 running on the user devices 102. Similarly, user response data relating to the content distributed to the user applications 104 can flow from the user devices 102 back through the content distribution and analysis API 242. Other APIs such as the user reporting API 234 can additionally or alternatively be utilized for ingestion of user response data from the user devices 102.

The user web portal 232 provides users with access to at least a portion of the core user services 200. Similarly, the developer web portal 252 provides developers with access to at least a portion of the core developer services 210.

By way of example, the user services accessible via the user web portal 232 in the present embodiment include user reporting services configured to process user response data received from the user devices 102. Such services are illustratively implemented at least in part by the user reporting engine 206, possibly operating in conjunction with one or more other components such as the user management module 208.

Other examples of user services accessible via the user web portal 232 include services provided by the knowledge mastery engine 202 and the remediation engine 204.

Figure 8:
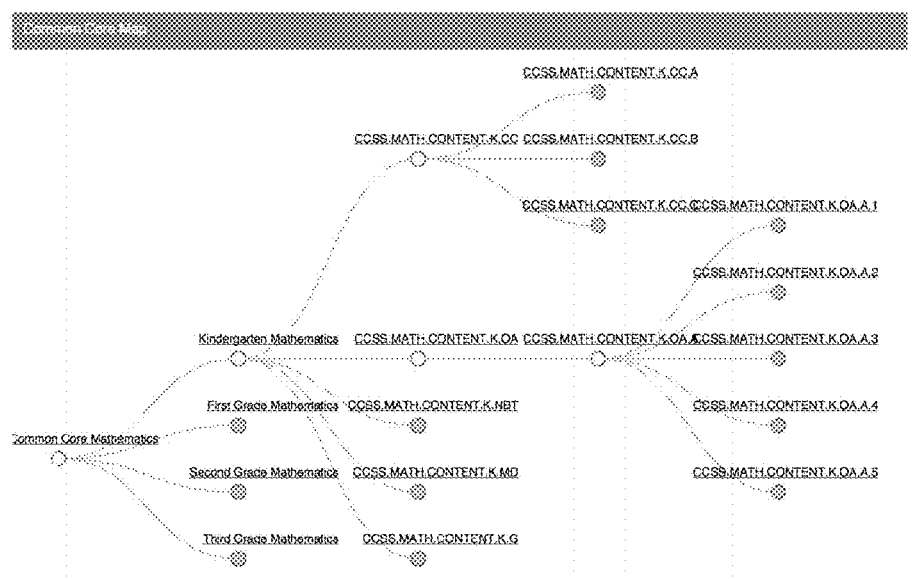
FIG. 8 illustrates a knowledge map comprising nodes associated with respective sets of problems in an illustrative embodiment.

The knowledge mastery engine 202 in the present embodiment is configured to determine when a given one of the users 106 has reached a particular level of proficiency relating to content and to adjust subsequent distribution of content to one or more of the user application programs 104 based at least in part on the level of proficiency determined for previously-distributed content. The level of proficiency may be determined for a portion of the content corresponding to a given one of a plurality of nodes of a knowledge map characterizing the content. An example of such a knowledge map for educational content is shown in FIG. 8.

The remediation engine 204 in the present embodiment is configured to adjust subsequent distribution of content to one or more of the user application programs 104 based at least in part on the analysis of the corresponding user response data for previously-distributed content.

These exemplary configurations of the knowledge mastery engine 202 and the remediation engine 204, as well as the described configurations of other system components, can be varied in other embodiments.

A given user of the system 100 can be designated as a mentor for one or more other users. A user designated as mentor need not be one of the "players" having an application that is actually consuming distributed educational content in the present embodiment, but could instead oversee the progress of the one or more other users with regard to consumption of the distributed educational content by their respective applications. A mentor can be, for example, a parent that supervises his or her children as respective players. It is also possible that a mentor could be a teacher or a coach that supervises multiple students or team members as respective players. All such players, mentors, parents, children, teachers, coaches, students and team members are considered illustrative examples of different types of users of the system 100. Numerous other user types and associated system accounts may be present in other embodiments.

It should be noted that terms such as "consume" and "consumption" as used herein with regard to delivered content are intended to be broadly construed so as to encompass a variety of arrangements through which user interaction with the delivered content in an application can be made apparent to the platform 110. For example, consumption of delivered content can be indicated by a user clicking on or otherwise activating or interacting with at least a portion of the content on the user device.

With respect to users designated as mentors, at least one user web portal implemented in the set of user interfaces 230 in the FIG. 2 embodiment can comprise a mentor web portal also associated with the content distribution and analysis API 242.

As will be described in more detail elsewhere herein, such a mentor web portal can be configured to allow a given user to review results of analysis relating to user response data from one or more other users for which the given user is designated as a mentor. Additionally or alternatively, the mentor web portal can be configured to allow a given user to award virtual items via at least one of the user application programs to one or more other users for which the given user is designated as a mentor.

Functionality described herein as being associated with a mentor web portal can additionally or alternatively be implemented at least in part within a mobile application or other type of user application program.

The developer services in the present embodiment illustratively comprise application management services provided by application management module 214 and configured to ensure interoperability of the content with the user application programs provided by the respective application developers.

By way of example, in such an arrangement, a given one of the application management services may be configured to permit a given one of the application developers to specify one or more particular parameters for content to be distributed from the platform 110 to a given one of the user application programs 104 provided by that application developer so as to ensure that only content compatible with the given user application program will be distributed from the platform 110 to the given application program.

This is advantageous in that it allows each developer to specify the particular formats and other parameters of the content that the developer would like to have delivered by the platform 110 to the applications provided by that developer.

Another developer service provided in the core developer services 210 is a developer compensation service implemented using the developer compensation engine 212. The developer compensation engine 212 in the present embodiment is illustratively configured to track consumption of distributed content by respective ones of the user application programs 104 and to determine amounts of compensation for respective ones of the corresponding application developers based at least in part on the tracked consumption of distributed content. Other types of techniques for compensating developers for content consumed by their respective applications can be implemented in the developer services portion of the platform 110.

The platform 110 can include additional or alternative components in other embodiments. For example, the platform 110 can include multiple content servers configured to deliver content to clients corresponding to respective user applications, in an embodiment in which the platform 110 is implemented in accordance with a client-server architecture.

Figure 3:
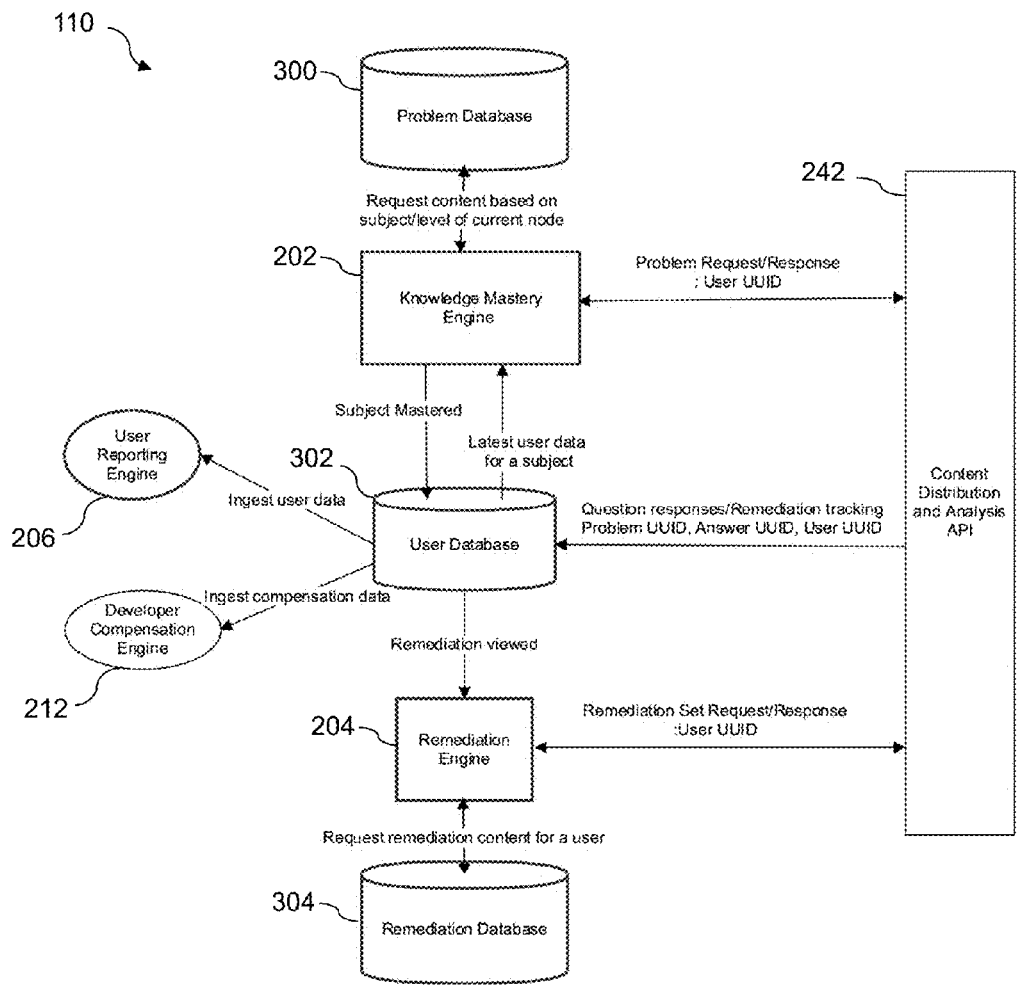

FIG. 3 shows an example of a particular functional configuration of the content distribution and analysis services platform 110 utilizing certain components previously described in conjunction with FIG. 2, including knowledge mastery engine 202, remediation engine 204, user reporting engine 206, developer compensation engine 212 and content distribution and analysis API 242.

The FIG. 3 embodiment further comprises content repositories illustratively comprising a plurality of distinct databases including problem database 300, user database 302 and remediation database 304. The knowledge mastery engine 202 and remediation engine 204 interact with respective ones of the problem database 300 and the remediation database 304. The knowledge mastery engine 202 and remediation engine 204 both also interact with the user database 302 and the content distribution and analysis API 242 as shown.

The user database 302 receives question responses and remediation tracking information for particular problem, answer and user combinations from the content distribution and analysis API 242 as indicated. User data from the user database 302 is ingested by the user reporting engine 206. Similarly, compensation data from the user database 302 is ingested by the developer compensation engine 212.

As mentioned previously, it is assumed in this embodiment that the content stored in the content repositories comprises educational content.

More particularly, it is assumed that the educational content stored in the problem database 300 comprises a plurality of problems each configured in accordance with a predetermined data schema comprising question, answer and distractor data types. The data schema is advantageously configured to support uniform analysis of user response data across the multiple distinct user application programs 104, regardless of the particular application developers that provided respective ones of the application programs or the particular application program development environments in which the application programs were developed.

Figure 4:
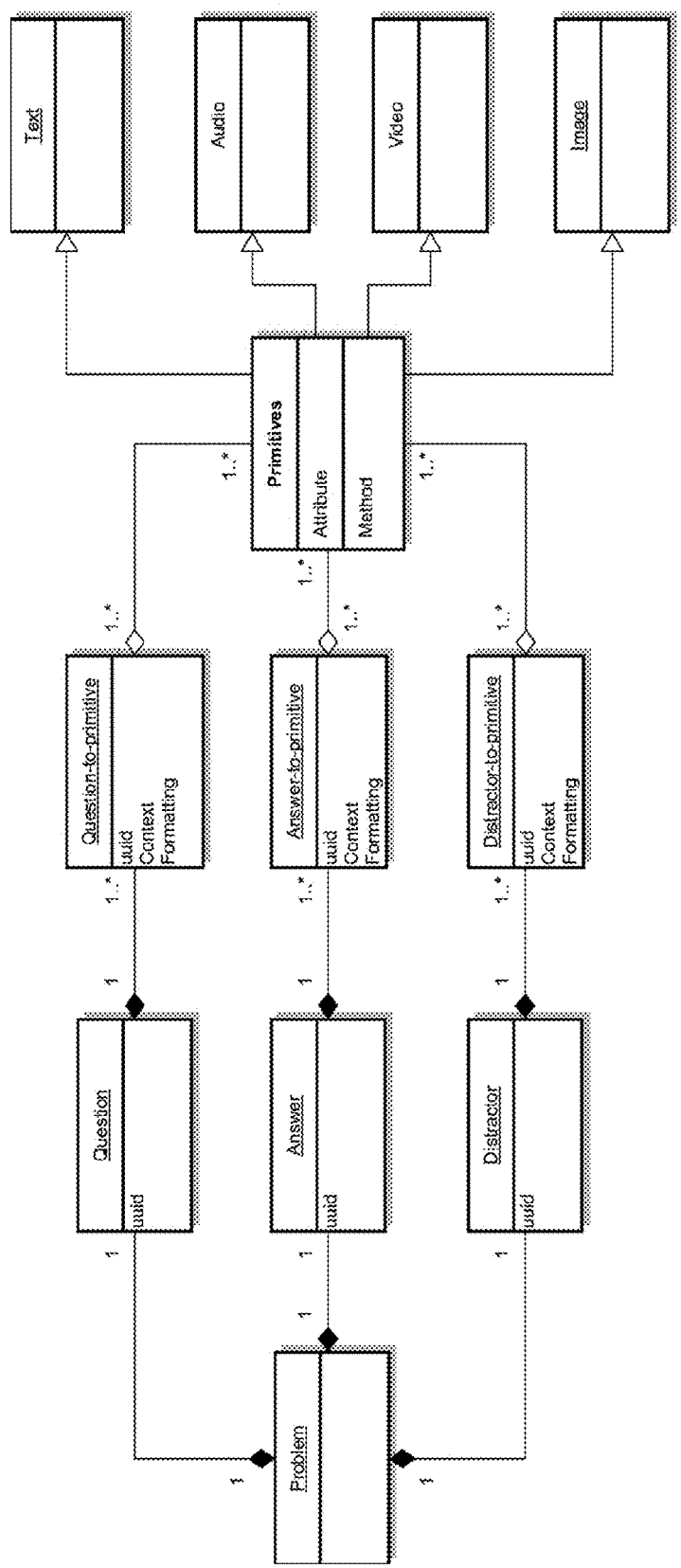
FIG. 4 illustrates relationships between database elements in an illustrative embodiment.

An example of the data schema is shown in FIG. 4. This figure illustrates the relationships between database elements, including the question, answer and distractor data types associated with a particular problem that is part of the educational content distributed via the platform 110 in this embodiment.

In this example data schema, each of the data types associated with a given one of the problems is mapped to one or more of a plurality of content primitives using a corresponding one of a plurality of data type to primitive mappings including question-to-primitive, answer-to-primitive and distracter-to-primitive mappings. The content primitives illustratively include text, audio, video and image, although it is to be appreciated that additional or alternative content primitives could be used.

The FIG. 4 data schema is just one possible relational database arrangement that can be used to model educational content within the system 100. This exemplary content modeling facilitates interaction of application developers with the content and integration of the content into a wide range of different applications that utilize such content. It provides flexibility to support future developments in learning media, but is also sufficiently constrained such that collected user response data relating to assessment, remediation and encouragement can be analyzed in an accurate and efficient manner.

Although the FIG. 4 example uses relational database terminology to describe the relationships between data elements, other embodiments can utilize alternative arrangements to characterize data in a content repository. For example, combinations of multiple related content items could be represented as a single record by joining across the individual content item records and serializing to a hash-key store or another flat representation format. Each type of content, including related assessment, remediation and encouragement elements, can be mapped into one or many base objects.

As noted above, one or more users in the system 100 can be designated as mentors for other users. Accordingly, user accounts in the system 100 illustratively include mentor accounts and what are referred to herein as "child accounts." More particularly, a mentor account for a given mentor has one or more associated child accounts, with the child accounts representing respective user accounts for which the given mentor has been designated. The users that are designated as mentors have administrative privileges over the corresponding child accounts. A given mentor account can have up to a predetermined maximum number of child accounts (e.g., 5 child accounts) associated with it. The mentor account in such arrangements may alternatively be denoted as a "parent account" relative to its corresponding child accounts.

The mentor account in the present embodiment is assumed to be identified by its email address, while child accounts and other user accounts are each assigned a universal unique identifier (UUID) comprising a 128-bit number. A given UUID is represented in canonical form by 32 lowercase hexadecimal digits, displayed in five groups separated by hyphens, for a total of 36 characters (32 alphanumeric characters and four hyphens). The UUIDs referred to herein are illustratively configured as Version 4 UUIDs, although other versions and identifier types can be used in other embodiments.

The mentor accounts are supported by a mentor web portal that can be accessed via a mentor application program running on a user device. A given one of the mentor accounts is accessible using the corresponding mentor email address and a secure password. The mentor web portal is configured to allow each mentor to access assessment, remediation and encouragement functionality for its corresponding child accounts, as well as other user management functionality such as billing and profile management. The child account UUID is used across the content distribution and analysis services provided by platform 110 in order to track state information for the corresponding user.

The content distribution and analysis API 242 in the present embodiment is illustratively implemented as a RESTful API, where REST denotes representational state transfer. The API 242 is exposed to mentors and other users, as well as to application program developers, via the network 105. The API 242 in this embodiment is accessible with an access token and an application identifier. The access token alone can be used to identify an application depending on the level of security required.

Figure 5:
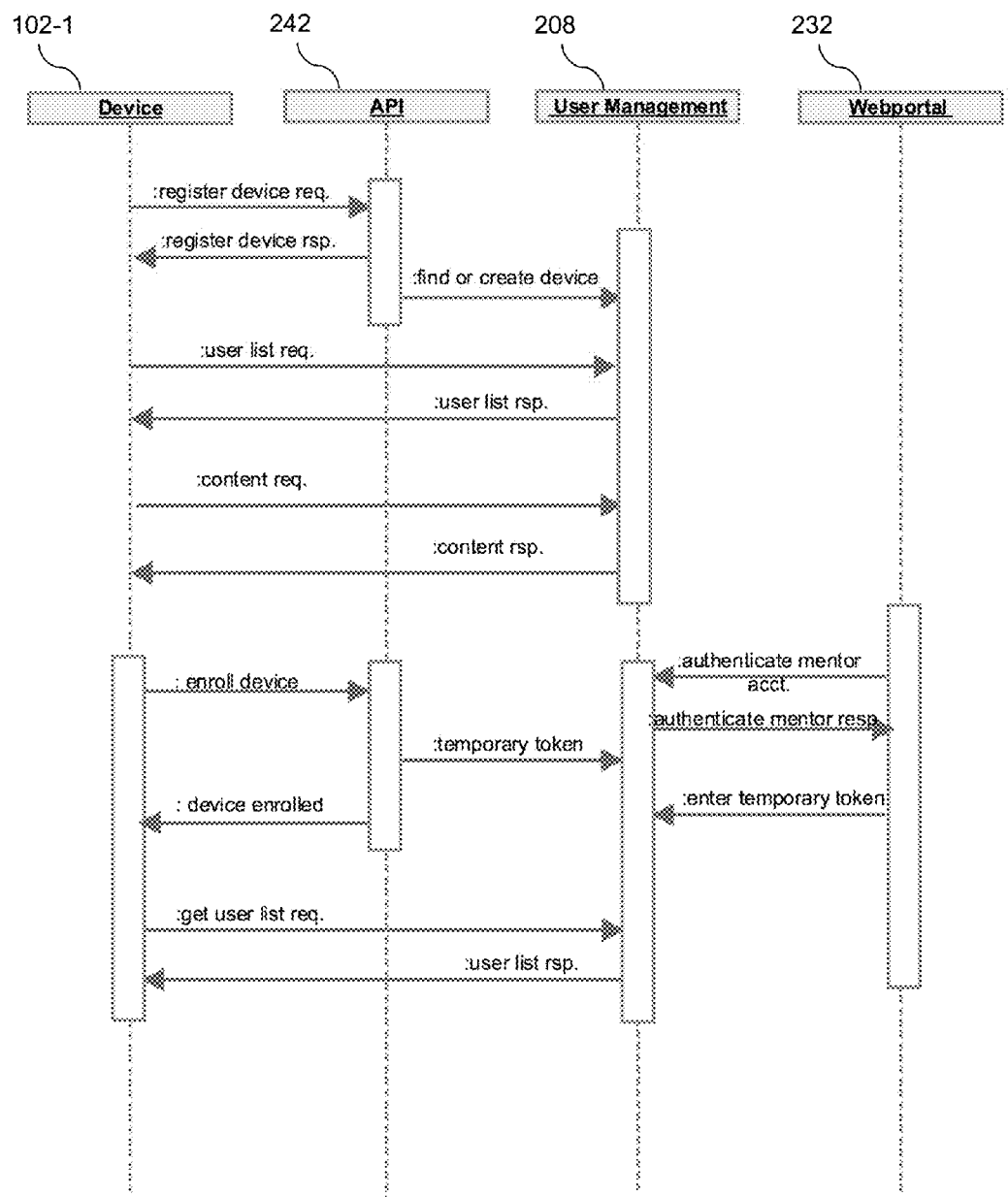
FIG. 5 is a signal flow diagram showing communications between system elements in an illustrative embodiment.

Examples of messaging associated with the API 242 can be seen in the signal flow diagram of FIG. 5. This diagram more particularly illustrates communications between a given one of the user devices 102-1, the API 242, the user management module 208 and the user web portal 232 in an illustrative embodiment.

In this embodiment, the user device 102-1 registers with the platform 110 by initially exchanging register request and response messages with the API 242. The API 242 interacts with the user management module 208 to find the device if it is an existing device already registered with the platform 110 or to create the device as a new device. The device once registered exchanges list request and response messages with the user management module 208, followed by content request and response messages.

Also illustrated are enrollment messages exchanged between the user device 102-1 and the API 242, which are associated with provision of a temporary token from the API 242 to the user management module 208. The user management module interacts with the user via the user web portal 232, illustratively a mentor web portal in this example, in order to authenticate the user as a mentor for the particular enrolled device. The user enters the temporary token via the user web portal 232 in order to complete the authentication process. The device can then again exchange list request and response messages with the user management module 208, as well as additional messages such as content request and response messages associated with content distribution.

Examples of particular message formats suitable for utilization in the messaging of FIG. 5 will be described in more detail elsewhere herein.

Referring again to the platform 110 as illustrated in FIG. 3, assessment, remediation and encouragement functionality are configured to assist a user in understanding and progressing through a particular subject relating to education content.

The purpose of the assessment is to understand user mastery level of a concept, topic or other category. For example, assessment could be in the form of a presented problem "2+2=_" where the answer is "4." In more advanced examples, educational content could be in the form of an open-ended question with no wholly correct answer but nonetheless requiring a user response. A response could include a written interaction, auditory interaction, physical interaction or other interaction with a physical or virtual medium. For example, a video could be played to a user on a mobile telephone asking the user to move the mobile telephone in a counterclockwise direction. The question presented in this context is which direction is counterclockwise and the correct answer is to move the device in the counterclockwise direction, thereby demonstrating user understanding of the concept, topic or other category.

Remediation illustratively comprises targeted material for a concept, topic or other category that the user has not yet mastered and therefore requires assistance to further his or her understanding. For example, users having trouble mastering addition could be presented with an educational video in order to facilitate their understanding of that concept.

Encouragements illustratively include content that is sent under the control of the mentor with the purpose of providing positive feedback to the user. Such content can include, for example, emoticons, rewards, text messages, etc.

The mentor can access the assessment, remediation and encouragement functionality of the platform 110 via the mentor web portal in order to obtain insight into the progress of the user, select remediation content, and provide virtual awards or other encouragement. Each problem presented and the corresponding user response may be made accessible to the mentor via the user reporting engine 206 or other system component.

The remediation in this embodiment can be automatic or introduced under the control of the mentor. Automatic remediation is illustratively carried out by the remediation engine 204 implemented in platform 110. The remediation is configured to operate across all relevant user response data sets to make informed decisions about presenting remedial material to a user, and may be implemented using one or more software daemons.

For example, assume that two users, denoted User 1 and User 2, are both working through a similar knowledge map focused on learning the fundamentals of the English language. Further assume that both User 1 and User 2 have not yet progressed through identifying the correct order of the English alphabet. However, the platform 110 subsequently identifies that, after hearing the alphabet read out aloud as an audio segment, User 1 was able to progress through identifying the correct order of the English alphabet. Moreover, the platform 110 determines that User 1 has a similar pattern in its prior history of incorrect answers to that of User 2. Based on this information, the automatic remediation function of the platform 110 selects the same audio segment that proved successful with User 1 for delivery to User 2. Such selection of remediation content can be implemented at least in part utilizing a Bayesian network such as a Kohonen neural network or other types of fuzzy clustering to identify that User 2 and User 1 are statistically similar in their understanding of a subject.

Mentor-introduced remediation can be provided by configuring mentor accounts with the ability to select remediation content available through the platform 110 for delivery to a particular child account when that user encounters a predetermined issue or subject. For example, when the user encounters the predetermined issue or subject in the course of interacting with the application program, the remediation content selected by the mentor is delivered in conjunction with automatically selected content. Hybrid combinations of automatic and mentor-introduced remediation can therefore be used.

The encouragement functionality provided to the mentor in the FIG. 3 embodiment can include an ability for the mentor to award virtual items to a user associated with one of its child accounts. For example, such an arrangement can be implemented as a virtual sticker book that allows the mentor to reward the user on terms controlled by the mentor. Such virtual items are collected by the user and are viewable in the corresponding child account.

Figure 6:
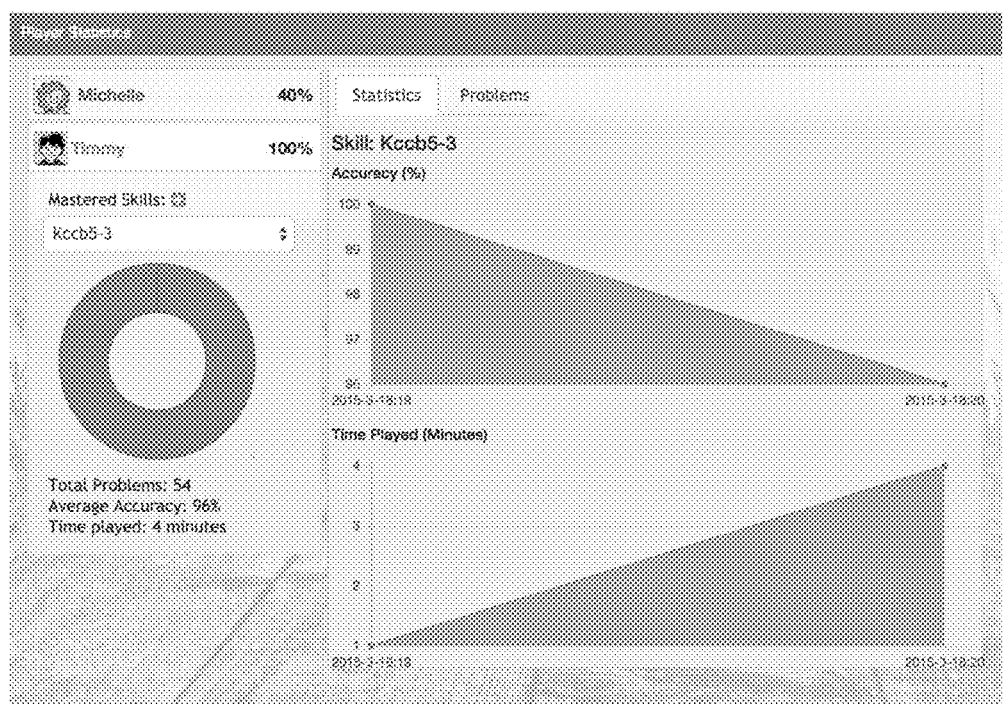
FIGS. 6 and 7 show examples of user interface screens generated in illustrative embodiments.
Figure 7:
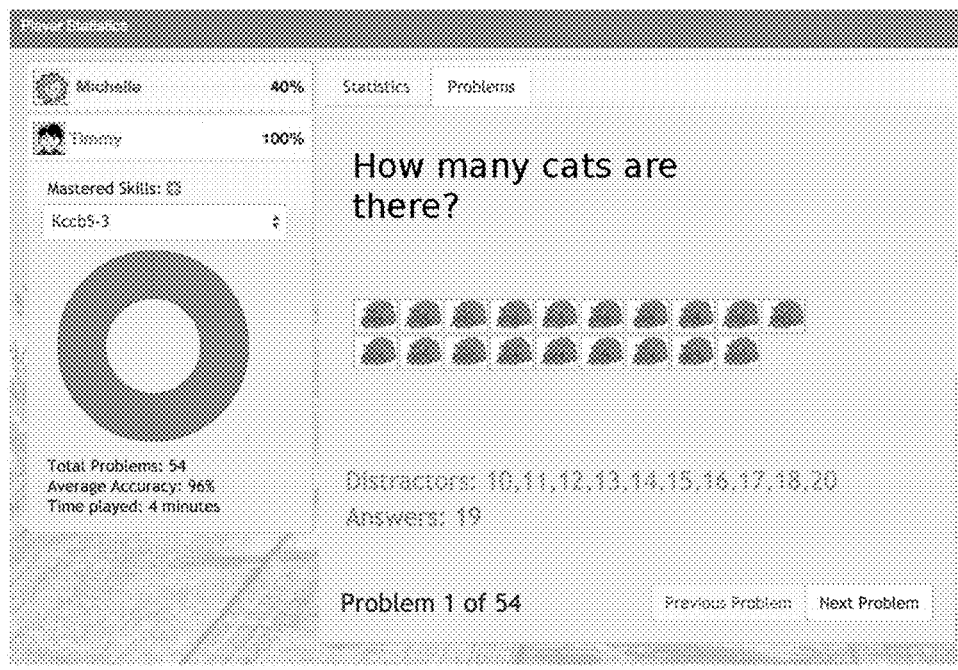

Examples of user interface screens presented to a mentor via a mentor application running on a given mentor device are shown in FIGS. 6 and 7. In these examples, a mentor is presented with summary statistics as illustrated in FIG. 6 for two child accounts controlled by that mentor. The child accounts are for respective users denoted as Michelle and Timmy. The interface screen presented in FIG. 6 allows the mentor to see user response statistics including the total number of problems, the accuracy percentage for the user responses to those problems, and the amount of time played. The mentor can focus in on a particular problem as illustrated in FIG. 7 in order to review the problem itself, the answer and the distractors.

Each child account in the FIG. 3 embodiment may be associated with a knowledge map for a given subject. For example, a knowledge map for the subject of mathematics could comprise a series of nodes specifying particular levels, and corresponding concepts, topics or other categories, within that subject. The subjects in some embodiments are aligned by default with particular educational standards, such as Common Core standards.

A knowledge map for mathematics aligned with Common Core standards is shown in FIG. 8, and includes a hierarchical arrangement of nodes, with a root node corresponding to the high-level subject category of Common Core Mathematics, and subordinate nodes for different levels within this subject category, including Kindergarten Mathematics, First Grade Mathematics, Second Grade Mathematics, and so on.

Figure 9:
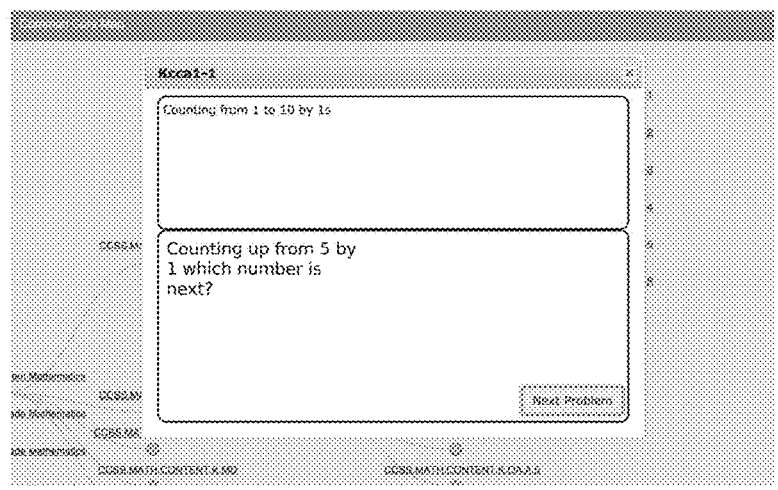
FIG. 9 illustrates an individual problem associated with a given node of the knowledge map of FIG. 8.

The Kindergarten Mathematics node in the FIG. 8 knowledge map also includes subordinate nodes for concepts, topics or other categories within that level, specifying a curriculum appropriate for kindergarteners. All users at the Kindergarten Mathematics level start at counting and cardinality (CC) and multiple nodes represent problems that assess this subject. An example problem associated with a particular one of these subordinate nodes corresponding to the CC category at the Kindergarten Mathematics level is shown in FIG. 9.

As a user responds to problems delivered to its user application program by the platform 110, the knowledge mastery engine 202 assesses user mastery of a concept, topic or other category associated with a given node in the knowledge map and determines when to introduce a new concept, topic or other category associated with another node in the knowledge map. It should be noted in this regard that each user need not be restricted to receipt of content for only a single node in the knowledge map at a time. Instead, fuzzy relationships between nodes can be utilized in selecting appropriate problems for delivery to particular users at different times. Like the remediation engine 204, the knowledge mastery engine 202 can be implemented using one or more software daemons.

The knowledge maps utilized by the platform 110 can be configured on a per-user basis. For example, a mentor can construct a particular customized curriculum to be followed by an individual user. In one such arrangement, a default knowledge map for Kindergarten Mathematics might be configured such that users move through counting and cardinality, addition and subtraction, in that order. However, the mentor may wish to have the user move through subtraction, addition and finally counting and cardinality. This customized curriculum can be achieved by the mentor specifying a reordering of the nodes in the knowledge map for that user. Similar types of node reordering can be used to generate custom curricula for any other type of educational content predicated on achieving an understanding of one subject before progressing to another subject.

As mentioned previously, the platform 110 illustratively incorporates a developer web portal 252. The developer web portal 252 allows application developers to manage the type of content that is delivered by the platform 110 to their applications and to receive compensation for consumption of such content by the applications.

Access to the developer web portal 252 requires authentication. In this embodiment, each developer is identified by a corresponding email address, and an 8-64 character length password is required in order to access the developer account. Each application registered in the platform 110 is assigned a UUID and is given a 128-bit access token. The application UUID is used to track user response data and other information such as user referrals received from the corresponding application. The access token is used to authenticate incoming requests and responses directed by the application to the content distribution and analysis API 242.

The core developer services 210 are accessible to developers via the developer web portal 252. These developer services include application management services provided by the application management module 214. Such application management advantageously allows an application developer to customize the particular types of content that are supported by a corresponding one of the applications 104. For example, some applications may only support single-answer multiple choice problems while others can support problems with multiple acceptable answers, open-ended answers, etc. There are also formatting considerations to take into account, such as, for example, a given application requiring that an answer can only span 20 characters or that a question can only take up 100×100 pixels if the question is in the form of an image. This application management functionality of the platform 110 serves to ensure that only particular types of content that can be supported by a given application will be delivered by the platform 110 to that application.

The core developer services 210 further include developer compensation services supported by the developer compensation engine 212. In the FIG. 3 embodiment, the developer compensation engine 212 of platform 110 is configured to control compensation of developers for consumption of platform-delivered content in their respective applications 104. For example, developers can incorporate platform-delivered problems seamlessly into their respective applications at particular insertion points and under particular conditions determined by the developers. As a more particular example, a developer can configure an application to switch at a particular point to an educational mini-game from a games library maintained by the platform 110. The developer can additionally specify the point at which the application should resume normal operation. It is also possible for the developers to utilize the platform 110 independently of their respective applications.

The developer compensation engine 212 tracks the number of problems or other content items served by the platform 110, the user applications that have consumed the content, and the developers that should be rewarded for their efforts. Developers can be compensated not only for utilizing content delivered by the platform 110 but also for referring users to the platform 110 via their respective applications. Such an arrangement is advantageous in that it provides unique compensation opportunities for developers that encourage their utilization of the platform 110. For example, such arrangements can reduce the need for developers to rely on advertising revenue to support their applications, thereby providing significant benefits to both the developers and the application users.

An example of an educational game use case for the platform 110 is as follows. Assume that a given application developer wishes to create a flash card game called "Flashy." Flashy is a simple multiple choice game where the user has 30 seconds to answer a question before the next question is presented. The developer decides to use the platform 110 for its content repository provider. Now, when a user starts playing Flashy, if the user is recognized by the platform 110 then Flashy will receive content based on the prior progression level of the user for his or her current focus of study. In addition, the user is also offered remediation material in the form of short videos to help them along in mastering a concept, topic or category. The user may also receive encouragements in the form of video, audio, text, emoticons or other virtual gifts from a mentor.

Additional details will now be provided regarding content modeling in platform 110 in accordance with the example data schema shown in FIG. 4. The content modeling is described in conjunction with assessment functionality, but it is to be understood that similar modeling can be used for other data elements, such as data elements relating to remediation and encouragement functionality.

As mentioned previously, the assessment modeling for the educational content in the FIG. 4 example is based on four distinct types of content primitives that can be combined to create assessment content in the form of problems. These four primitives are text, audio, video and image.

The text primitive is used to represent any type of text from a single character to a string. The model for the text primitive can be written as:

UUID(128-bit string), content(string), context(string), abbreviation(string).

An example text element is "Given the number 1 and counting up by 1 which number comes next?"

The "content" field in this example denotes the full representation of the problem "Given the number 1 and counting up by 1 which number comes next?" The "context" field is used with the "abbreviation" field to provide a snippet of what the problem is asking without displaying the full text. In the present example, context could be "Counting from a number by 1?" and the abbreviation would simply be "1."

The image primitive is used to represent information about an image. The model for the image primitive can be written as:

UUID(128-bit string), serialized (byte-array), URL (string), metadata(string).

The "serialized" field is used when the desired image is local to the platform 110. The image is assumed to be converted to a byte-array and encoded using Base64 encoding. All images hosted locally to the platform 110 are assumed to be .png or .svg, although other types of images can be used. The URL or Uniform Resource Locator field is used in the event that the image is external to the platform 110. Metadata is used to specify the image size, type, and any additional information required for utilization of the image.

The audio primitive is used to represent information about an audio clip, and the video primitive is used to represent information about a video clip. The model for the audio primitive or video primitive can be written as:

UUID(128-bit string), URL(string), metadata(string).

The QUID, URL and metadata fields in this model serve roles similar to the corresponding fields in the image primitive model, basically allowing a developer to configure an application to play back the audio or video clip. Serialization is not added to the audio or video primitive model, since it is generally preferable to use audio or video streaming rather than to attempt to send an entire audio or video file in a single message.

The metadata associated with the audio, video and image content primitives in the above examples can illustratively be used for visual formatting. For example, such metadata can include HTML5/CSS3 data for cross-platform support, where HTML denotes HyperText Markup Language and CSS denotes Cascading Style Sheets, although other markup languages or metadata formats could be used.

The four content primitives described above are utilized in generating the question, answer and distractor data types.

A given composite of question, answer and one or more distractors is unique to a problem, while the content primitives that comprise each such composite are not. In general, a question does not share many elements with other questions, but there is a large amount of overlap between answers and distractors.

The data type to primitive mappings including the question-to-primitive, answer-to-primitive and distractor-to-primitive mappings are respective intermediary objects that serve to join the content primitives to unique composites. In a relational database implementation of the content repository, a given mapping can be implemented as a polymorphic join between the data type and its associated content primitives.

As shown in FIG. 4, each such data type to primitive mapping includes context and formatting fields. The formatting fields can be used by developers to facilitate visual formatting of the content primitives, possibly via CSS overrides or other techniques, thereby allowing the developer to seamlessly integrate the content primitives into the particular look and feel of a given application. Such an arrangement can advantageously ensure that content delivered by the platform 110 into an application does not appear to the user as being dynamically sourced from outside the application.

Each of the question, answer and distractor data types can be written as:

UUID+Problem Foreign key (UUID)+formatting (string)

The question data type characterizes the content that a developer can present to a user as a prompt in an application program. For example, "2+2=_" is a valid question in the platform 110. In this simple example, the question comprises a single text element. However, there can be a polymorphic relationship between a given question and the many primitives that can comprise that question. As noted above, the data type to primitive mappings serve as intermediary objects between the data type and its associated content primitives.

The question-to-primitive mapping can be written as:

UUID+Question Foreign key (UUID)+Primitive Foreign key (UUID)+Primitive Type+required (boolean)+order (unsigned integer)

The "required" field indicates whether the primitive is required for the question to make sense to the user. The "order" field is a positive value starting at 1 that indicates the ordering of the primitives. The question itself is a join between a master problem record and the set of content primitives for the question.

Using this arrangement, it is possible to construct questions that embed various combinations of text, audio, video and image primitives. For example, a question could be a composite of text and audio of the form <audio file playing 5 bird chirps>+"how many bird chirps did you hear?"

The answer data type can include answers to open-ended questions or determinative questions. A question is considered open-ended if there is no way to determine correctness of a user response given the current information. An example of an open-ended question is "How do you feel today?" There is no correct answer to such a question, only indications that the user has submitted a response and that response has been recorded. Accordingly, in the case of an open-ended question, the answer data type can be configured to contain only a single field indicating that the answer is open-ended.

A determinative question has one or more correct responses that can be determined at response time. A multiple choice question is one example of a determinative question. More advanced questions could be of the form "Select the letters to spell what animal is in the picture"+<dog.png>. The answer in this case is a sequence of letters that must be selected by the user, namely, "D"+"O"+"G".

The answer-to-primitive mapping can be written as:

UUID+Answer Foreign key (UUID)+Primitive Foreign key (UUID)+Primitive Type+open (boolean)+order (unsigned integer)

A number of these fields serve roles that are similar to those of the corresponding fields in the question-to-primitive mapping. The "open" field indicates to the developer that there is no check that can be made to determine correctness of an answer.

A distractor is similar in some respects to an answer, but is presented alongside the real answer to misdirect the user if the user does not have a firm understanding of the concept, topic or other category. For example, in the case of the question "2+2=_", the answer is "4", while a possible set of distractors could include one or more of "1, 2, 3, 5, 6, 7, 8, 9, 10." The distractors are generally presented in accordance with the skill level of the user attempting to answer the question. In the present example, each distractor could be considered a reasonable answer if the user were guessing, while the number 100 would appear out of place for the user.

The distractor-to-primitive mapping can be written as:

UUID+Distractor Foreign key (UUID)+Primitive Foreign key (UUID)+Primitive Type+order (unsigned integer)

This distractor-to-primitive mapping is similar to the answer-to-primitive mapping. However, the "open" field of the answer-to-primitive mapping is dropped since a distractor is generally not utilized in the case of an open-ended answer.

The problem itself in the FIG. 4 arrangement is illustratively comprised of a question, an answer and one or more distractors, and can be written as:

UUID+Question Foreign Key (UUID)+Problem Foreign Key (UUID)+Distractor Foreign Key (UUID)+category (string)

The "category" field denotes the particular concept, topic or other category with which the problem is associated. There is typically a direct mapping between a problem and the category that a user is currently working on in accordance with a particular knowledge map. As mentioned previously, the category may correspond to a given single node in the knowledge map, although it is possible for a problem to be associated with multiple categories and therefore multiple nodes in the knowledge map.

An example problem utilizing the data types, mappings and content primitives described above is as follows. For this example, the question is "2+2=_", the answer is "4", and the distractors are "1, 2, 3, 5."

Problem:
  uuid: de305d54-75b4-431b-adb2-eb6b9e546013
  question fk:e689b02a-edd8-496e-a0c3-4f7978c276aa
  answer fk:59c4676e-3f57-4e6c-9149-18965db682ea
  distractor fk:b8fd81d1-5982-4ce2-8611-c8377952073c
  category: "simple addition"
Question:
  uuid: e689b02a-edd8-496e-a0c3-4f7978c276aa
  required: true
  Question-to-primitive1:
    uuid: fc43c0b6-00af-452a-89fb-2a6ba48c9727
    question fk: e689b02a-edd8-496e-a0c3-4f7978c276aa
    primitive fk: af305c5d-7eb3-441c-adb2-eb6ed2346043
    type: "Text"
    order: 1
Text Primitive1:
  uuid: af305c5d-7eb3-441c-adb2-eb6ed2346043
  Content: "2+2=_"
  Context: "add the two numbers together"
  Abbreviation: ["2", "2"]
  Answer:
    uuid: 59c4676e-3f57-4e6c-9149-18965db682ea
    open: false
    Answer-to-primitive2:
      uuid: 024209cd-5de0-4691-8783-8195119dab25
      answer 1k: 59c4676e-3f57-4e6c-9149-18965db682ea
      primitive fk: dbbd61b6-8717-470c-89a8-9ecdd622ef87
      type: "Text"
      order: 1
Text Primitive2:
  uuid: dbbd61b6-8717-470c-89a8-9ecdd622ef87
  content: "4"
  context: "A number"
  abbreviation: "4"
  Distractor:
    uuid: b8fd81d1-5982-4ce2-8611-c8377952073c
    Distractor-to-primitive3:
      uuid: da82376f-15d5-45a1-9292-2e9b1f4496f5
      distractor fk: b8fd81d1-5982-4ce2-8611-c8377952073c
      primitive fk: d6c042ee-44d8-4357-b94e-380ae2b9bb82
      type: "Text"
      order: 1
    Distractor-to-primitive4:
      uuid: 91343f44-5f1f-4883-9de6-e0db87094114
      distractor fk: b8fd81d1-5982-4ce2-8611-c8377952073c
      primitive fk: 44bdc5d0-4e12-478a-b68d-c864fe6e3675
      type: "Text"
      order: 2
    Distractor-to-primitive5:
      uuid: 3b71faae-0478-40fb-a0db-0d6ae1ad03c5
      distractor fk: b8fd81d1-5982-4ce2-8611-c8377952073c
      primitive fk: 8d60e8e3-3c0d-4c0b-bbfa-d5cca69d3a43
      type: "Text"
      order: 3
    Distractor-to-primitive6:
      uuid: 5de2ae44-f18b-41a4-b449-125e9ecc109d
      distractor fk: b8fd81d1-5982-4ce2-8611-c8377952073c
      primitive fk: d975f0d0-f48e-475b-b2db-077c52425b4c
      type: "Text"
      order: 4
Text Primitive3:
  uuid: d6c042ee-44d8-4357-b94e-380ae2b9bb82
  content: "1"
  context: "A number"
  abbreviation: "1"
Text Primitive4:
  uuid: 44bdc5d0-4e12-478a-b68d-c864fe6e3675
  content: "2"
  context: "A number"
  abbreviation: "2"
Text Primitive5:
  uuid: 8d60e8e3-3c0d-4c0b-bbfa-d5cca69d3a43
  content: "3"
  context: "A number"
  abbreviation: "3"
Text Primitive6:
  uuid: d975f0d0-f48e-475b-b2db-077c52425b4c
  content: "5"
  context: "A number"
  abbreviation: "5"

This particular example, and the associated data schema on which it is based, should not be considered limiting in any way.

Since each content primitive can have a polymorphic association with multiple data types, additional data types can be incorporated as needed to accommodate the desired functionality of a given implementation. Accordingly, it is to be appreciated that embodiments of the invention are not limited to the particular question, answer and distractor data types and associated mappings described above. Numerous additional or alternative data schema using different arrangements of data types, mappings and content primitives, as well as different formats for each of these elements, can be used.

User responses are processed in the platform 110 at least in part by joining particular users with the problems for which they provided answers to questions. For example, a user response model can be utilized, having the following format:
  UUID (string)
  user foreign key UUID (string)
  problem UUID (string)
  duration (double integer)
  skipped (boolean)
  answer [Array of answer foreign keys]

The "duration" field is used to determine how long it took for the user to respond to the question associated with this particular problem. The "skipped" field indicates whether the question was successfully answered or not. Finally, the "answer" field is an array of foreign keys into all the possible content primitives. In this manner, the particular answer provided by the user is recorded as part of the user response data. If the question was an open-ended question, the "answer" field points to a special primitive record unique to the user. It should be noted that a given "foreign key" referred to in these and other examples herein is intended to encompass, for example, an identifier into one database table where the identifier is potentially defined in another database table. Other types and arrangements of keys or other identifiers can be used in other embodiments.

The above-described content and user response modeling provides a rich and flexible mechanism within platform 110 for the construction of problems, each of which can incorporate multiple distinct content primitives, while also facilitating the processing of corresponding user response data.

Moreover, the illustrative modeling arrangement provides architectural advantages in that all content primitives are shared across all problems. For example, a subtraction question that has an answer of "2" will map to the same content primitive as an addition problem that has an answer of "2." This advantageously allows for uniform analysis of user response data across different problem types. Such uniform analysis can significantly improve the performance of clustering algorithms utilized for remediation selection.

Message exchange aspects of the content distribution and analysis API 242 and other interfaces of the platform 110 will now be described in more detail. It is assumed that data is exchanged between the platform 110 and user devices or developer devices over HTTPS connections, where HTTPS denotes HTTP Secure, unless otherwise noted. While the specific Interface Description Language (IDL) used for data exchange in the platform 110 is Protocol Buffers ("protobufs"), alternatives such as Thrift, ASN.1, or a markup language such as JSON, YAML or XML, could additionally or alternatively be used for at least a portion of the messaging. All API calls are assumed to be RESTful.

The platform 110 is configured to verify the application and user associated with a given request for information requests or other access attempts. The application is verified in some embodiments by requiring that messages exchanged between the platform 110 and the application carry access tokens. As mentioned previously, such an access token is unique to a given application, and may be implemented as a cryptographically strong 128-bit hexadecimal key. The platform 110 can be configured to allow an application to have multiple such keys active at a given time for versioning purposes.

In addition, the user is verified through an authentication process. For example, the user may be required to present a user identifier (e.g., email address) and a password along with the application access token. Additionally or alternatively, the authentication process can associate each pair of a particular user and a particular user device, also referred to as a user-device pair, with a unique identifier in the platform 110. This information can be accessed through OS API level system calls or generated by a special platform client. For example, a combination of the MAC address of a device and the UUID of the application could be used as the unique identifier of the user-device pair. The unique identifier of the user-device pair is also denoted herein as UDID.

When the application first starts on the user device, it sends a request message to the platform 110 announcing its presence. The request message and its corresponding response message are of the form:
POST Register Device Request:
Access Token (128-bit)+UDID (32/64/128-bit)
POST Register Device Response:
Success+Message+Authentication Token (32-bit hexadecimal short lived key)

The response from the platform 110 to the request includes an authentication token. Each subsequent request to the platform 110 generates a new authentication token to avoid token timing attacks. In the event that this is the first time the given device has registered with the platform 110, a temporary user account is created for the given device. Request and response messages associated with device enrollment are of the form:

POST Enroll Device Request:
Access Token+UDID+Temporary Token
POST Enroll Device Response:
Success+Message When a mentor wishes to associate a particular user device with his or her mentor account, a randomly generated 6-8 character string is presented to the user at the particular user device and a message is sent to the platform 110 with the same string. If device confirmation is initiated from the application itself, assuming the device supports a default web browser, an option is given for auto-enrollment, for example, in the form of an auto-enrollment button.

When the user clicks the auto-enrollment button, the default web browser on the device is opened and directed to a device enrollment path with the temporary token in a parameters list. HTTPS is utilized to ensure a secure transmission to a web form that is filled in using the temporary token. If the user has a previous unexpired secure session with the user web portal, then the key is entered and submitted. In the event the user has not signed in with the web portal through the device or the secure session has expired, the user is required to enter his or her email and password before continuing to the enrollment form.

The platform 110 performs a search on the temporary token entered and matches the token with the device the user is attempting to tie to his or her account. If a match is found, the temporary token is removed from the device and the mentor is now set as the owner of the device. Subsequent requests to the API 242 from the device are associated with the specified mentor account. While this approach is still susceptible to a man-in-the-middle attack, the worst case damage to the user account is that the attacker can answer level-appropriate questions for that user. In this embodiment, any sensitive information about a user account exposed to a developer is restricted to problem format and a list of usernames. In general, most messages are read-only in nature, with the exception of updating user responses.

The delivery of content to the application is initiated by the application sending a request to the platform 110. The request and response messages are of the form:
GET Content Request:
Access Token+Authentication Token+unique user ID+content count
GET Request for Content Response:
Success+Message+Content Response List The request tells the platform 110 to provide a designated number of problems for an application A and a user B. The platform 110 knows the problem formats supported by application A and the current appropriate level of content for user B. Using these parameters, the designated number of problems are returned to the application. Each of the problems comprises a question, answer and one or more distractors as previously described. Based on user interaction with the content exposed by the application, the application can record an answer and submit the answer back to the platform 110. The request and response messages are of the form:
POST Content:
Access Token+Authentication Token+unique user ID+Content answer list
POST Content Response:
Success+Message The answer is recorded in the platform 110 for subsequent processing by the analysis service. Other types of user response handling are possible. For example, the application can provide a skip question button, which when activated by the user causes the problem to be skipped such that no answer is recorded.

Remediation and encouragement messages can be configured in a manner similar to the assessment messages described previously. For example, the remediation functionality may involve determining which remediation content is appropriate for the user and each remediation message request can be followed later by a response indicating whether or not the remediation was accessed by the user.

The example message formats provided above can be varied in other embodiments to use alternative formats and messaging protocols.

As noted above, the system 100 is implemented using one or more processing platforms each comprising at least one processing device.

Figure 10:
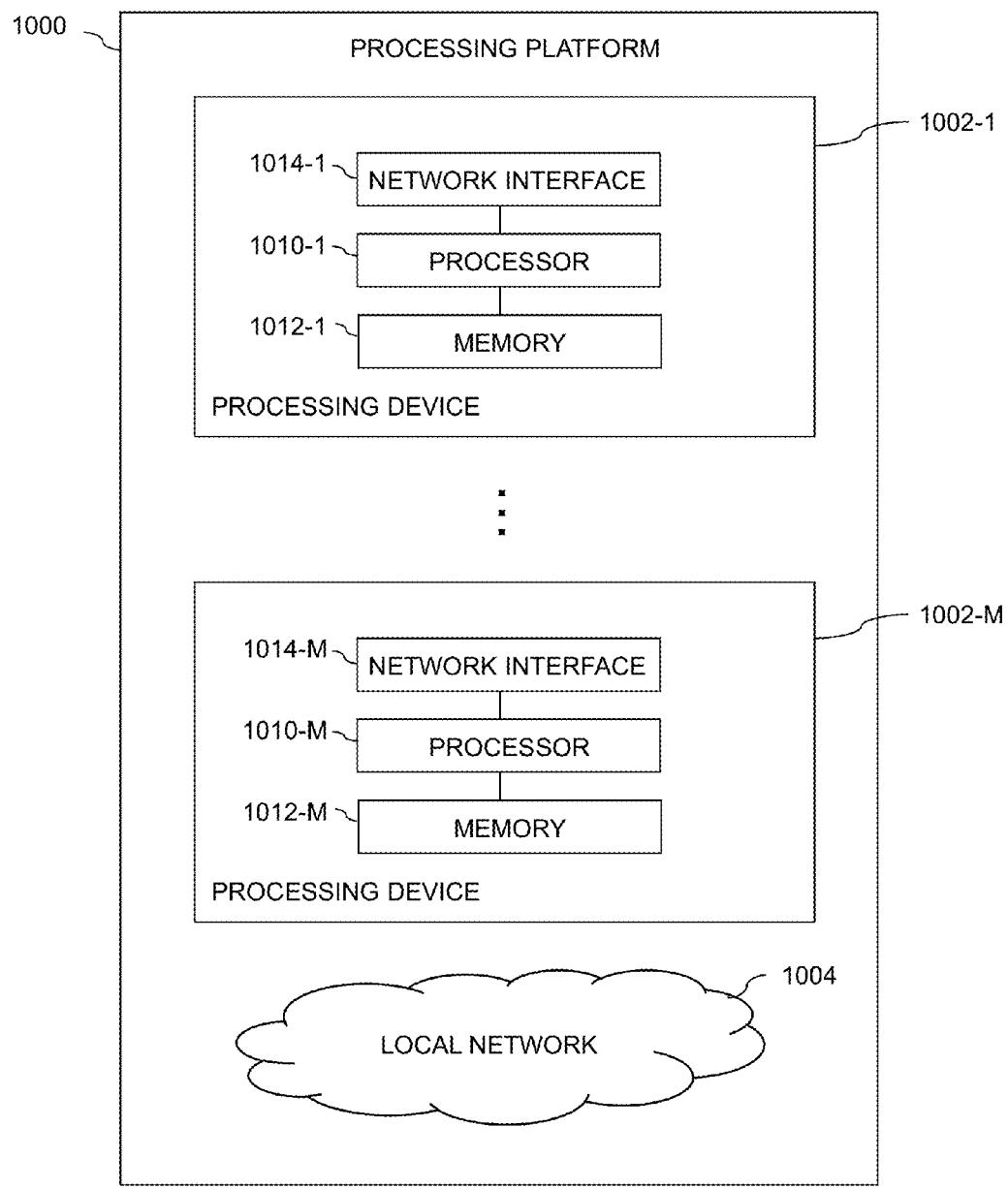
FIG. 10 shows an example of a processing platform utilized to implement at least a portion of the FIG. 1 system.

Referring now to FIG. 10, one possible implementation of a processing platform 1000 is shown. The processing platform 1000 comprises a plurality of processing devices 1002-1 through 1002-M. The processing devices 1002 are assumed to communicate with one another over at least one local network 1004.

The processing device 1002-1 comprises a processor 1010-1 coupled to a memory 1012-1 and to a network interface 1014-1.

The processor 1010-1 executes software code stored in the memory 1012-1 in order to control the performance of processing operations and other functionality. The network interface 1014-1 supports communication with other processing devices 1002 over the local network 1004 as well as communication between the platform 1000 and other system components such as the user devices 102.

The processor 1010-1 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 1012-1 stores software code for execution by the processor 1010-1 in implementing portions of the functionality of the system 100. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, some embodiments may be implemented in the form of integrated circuits comprising processing circuitry configured to implement processing operations associated with content distribution and user response analysis.

The other processing devices 1002 similarly include processor, memory and network interface elements. For example, processing device 1002-M includes processor 1010-M, memory 1012-M and network interface 1014-M.

Other system components such as the user devices 102 can each be implemented utilizing one or more processing devices each comprising a processor coupled to a memory.

It should be noted that the above-described system, platform and device arrangements are exemplary only, and alternative arrangements can be used in other embodiments. For example, various alternative arrangements of software and hardware components can be utilized to implement assessment, remediation and encouragement functionality in various content distribution and user response analysis contexts.

Accordingly, the particular system configurations illustrated in FIGS. 1, 2 and 3 are exemplary only, and a given such system in other embodiments may include other elements in addition to or in place of those specifically shown, including one or more elements of a type commonly found in a conventional implementation of such a system.

The illustrative embodiments described above can provide considerable advantages over conventional arrangements. For example, a system in an illustrative embodiment can be configured to deliver educational content or other types of content into user application programs in a particularly efficient manner. Such a system allows content to be delivered from content repositories into user application programs and allows mentors to view analysis relating to historical user response data. The content can be embedded seamlessly into a wide array of different user applications.

Some embodiments implement data schema based standardization of content items so as to facilitate transport of content and associated assessment, remediation and encouragement material into any user application. The content is configured and managed so as to ensure interoperability with the user applications. Also, the data schema facilitates tracking of user responses in a manner that allows for optimal data analysis across multiple distinct applications. A suite of particularly accurate and efficient analysis and reporting processes are built upon the data schema.

The platform allows content to be treated in a simple and standardized way that any developer can use. For example, in the context of a content-based educational game, any developer can create an educational game without being particularly knowledgeable on the subject. In addition, developers need not worry about adjusting content difficulty level or switching from one subject to another within the educational game.

Users benefit by being able to pick up any game within the platform ecosystem and immediately resume the subject and level that they left off on any other application. Furthermore, standardization of problems allows for better analytics across all the users within the platform 110. Remediation to struggling users can be targeted to a specific subject and skill level within any application.

The content distribution and user response analysis platform in some embodiments is illustratively configured to compensate developers financially based on the extent to which their respective applications consume platform-delivered content, as well as other factors such as referred users and impact on users, thereby allowing additional revenue streams for application developers.

Such a platform advantageously allows content to be seamlessly embedded in user applications and corresponding user responses to be captured. In some embodiments, a content distribution and user response analysis platform can be configured to deploy a hybrid advertising and educational network or a robust captcha system. The platform can be adapted for use with any type of content or user application.

It should again be emphasized that the embodiments of the invention as described herein are intended to be illustrative only. Other embodiments can be implemented utilizing a wide variety of different types and arrangements of information processing systems, processing devices, processing platforms, networks, modules, engines, interfaces, services, content types, data schema and other features and components than those utilized in the embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus comprising:
a processing platform configured for distribution of content to user application programs over a network and analysis of corresponding user response data received over the network;
said user application programs being provided by respective ones of a plurality of application developers;
said processing platform comprising:
at least one content repository configured to store the content;
at least one content distribution and analysis application programming interface exposed to the network;
one or more user web portals associated with said at least one content distribution and analysis application programming interface;
one or more developer web portals associated with said at least one content distribution and analysis application programming interface;
a plurality of user services accessible via the one or more user web portals; and
a plurality of developer services accessible via the one or more developer web portals;
the user services comprising user reporting services configured to process the user response data;
the developer services comprising application management services configured to ensure interoperability of the content with the user application programs provided by the plurality of application developers;
wherein at least one of the one or more user web portals comprises a mentor web portal associated with said at least one content distribution and analysis application programming interface;
wherein the mentor web portal is configured to allow a given user to award virtual items via at least one of the user application programs to one or more other users for which the given user is designated as a mentor; and
wherein the processing platform is implemented utilizing at least one processing device comprising a processor coupled to a memory.

2. The apparatus of claim 1 wherein the processing platform further comprises a user reporting application programming interface configured to interact with a user reporting application running on a given user device on which at least one of the user application programs is deployed.

3. The apparatus of claim 1 wherein the mentor web portal is configured to allow a given user to review results of analysis relating to user response data from one or more other users for which the given user is designated as a mentor.

4. The apparatus of claim 1 wherein the content stored in said at least one content repository comprises educational content.

5. The apparatus of claim 4 wherein the educational content stored in a problem database of said at least one content repository comprises a plurality of problems each configured in accordance with a predetermined data schema comprising question, answer and distractor data types.

6. The apparatus of claim 5 wherein the data schema is configured to support uniform analysis of user response data across the plurality of user application programs.

7. The apparatus of claim 5 wherein each of the data types associated with a given one of the problems is mapped to one or more of a plurality of content primitives using a corresponding one of a plurality of data type to primitive mappings including question-to-primitive, answer-to-primitive and distractor-to-primitive mappings.

8. The apparatus of claim 7 wherein the content primitives comprise at least a subset of text, audio, video and image.

9. The apparatus of claim 1 wherein the processing platform further comprises a developer compensation engine configured to track consumption of distributed content by respective ones of the user application programs and to determine amounts of compensation for respective ones of the corresponding application developers based at least in part on the tracked consumption of distributed content.

10. The apparatus of claim 1 wherein the processing platform further comprises a knowledge mastery engine configured to determine when a given user has reached a particular level of proficiency relating to content and to adjust subsequent distribution of content to one or more of the user application programs based at least in part on the level of proficiency determined for previously-distributed content.

11. The apparatus of claim 10 wherein the level of proficiency is determined for a portion of the content corresponding to a given one of a plurality of nodes of a knowledge map characterizing the content.

12. The apparatus of claim 1 wherein the processing platform further comprises a remediation engine configured to adjust subsequent distribution of content to one or more of the user application programs based at least in part on the analysis of the corresponding user response data for previously-distributed content.

13. The apparatus of claim 1 wherein at least one of the application management services is configured to permit a given one of the application developers to specify one or more particular parameters for content to be distributed from the processing platform to a given one of the user application programs provided by that application developer so as to ensure that only content compatible with the given user application program will be distributed from the processing platform to the given application program.

14. An information processing system comprising the apparatus of claim 1.

15. A method comprising steps of:
distributing content to user application programs over a network; and
analyzing corresponding user response data received over the network;
said user application programs being provided by respective ones of a plurality of application developers;
wherein the distributing and analyzing steps are implemented in a processing platform comprising at least one processing device;
the processing platform further comprising:
at least one content repository configured to store the content;
at least one content distribution and analysis application programming interface exposed to the network;
one or more user web portals associated with said at least one content distribution and analysis application programming interface;
one or more developer web portals associated with said at least one content distribution and analysis application programming interface;
a plurality of user services accessible via the one or more user web portals; and a plurality of developer services accessible via the one or more developer web portals;

the user services comprising user reporting services configured to process the user response data;

the developer services comprising application management services configured to ensure interoperability of the content with the user application programs provided by the plurality of application developers;

wherein at least one of the one or more user web portals comprises a mentor web portal associated with said at least one content distribution and analysis application programming interface; and wherein the mentor web portal is configured to allow a given user to award virtual items via at least one of the user application programs to one or more other users for which the given user is designated as a mentor.

16. The method of claim 15 further comprising:

tracking consumption of distributed content by respective ones of the user application programs; and determining amounts of compensation for respective ones of the corresponding application developers based at least in part on the tracked consumption of distributed content.

17. The method of claim 15 further comprising adjusting subsequent distribution of content to one or more of the user application programs based at least in part on the analysis of the corresponding user response data for previously-distributed content.

18. An article of manufacture comprising a non-transitory computer-readable storage medium having computer program code embodied therein, wherein the computer program code when executed in at least one processing device of a processing platform causes said at least one processing device to perform steps of:

distributing content to user application programs over a network; and analyzing corresponding user response data received over the network;

said user application programs being provided by respective ones of a plurality of application developers;

the processing platform further comprising:

at least one content repository configured to store the content;

at least one content distribution and analysis application programming interface exposed to the network;

one or more user web portals associated with said at least one content distribution and analysis application programming interface;

one or more developer web portals associated with said at least one content distribution and analysis application programming interface;

a plurality of user services accessible via the one or more user web portals; and a plurality of developer services accessible via the one or more developer web portals;

the user services comprising user reporting services configured to process the user response data;

the developer services comprising application management services configured to ensure interoperability of the content with the user application programs provided by the plurality of application developers;

wherein at least one of the one or more user web portals comprises a mentor web portal associated with said at least one content distribution and analysis application programming interface; and wherein the mentor web portal is configured to allow a given user to award virtual items via at least one of the user application programs to one or more other users for which the given user is designated as a mentor.

19. The article of manufacture of claim 18 wherein the processing platform further comprises a user reporting application programming interface configured to interact with a user reporting application running on a given user device on which at least one of the user application programs is deployed.

20. The article of manufacture of claim 18 wherein at least one of the application management services is configured to permit a given one of the application developers to specify one or more particular parameters for content to be distributed from the processing platform to a given one of the user application programs provided by that application developer so as to ensure that only content compatible with the given user application program will be distributed from the processing platform to the given application program.

* * * * *